(12) United States Patent
Kawano et al.

(10) Patent No.: US 9,378,890 B2
(45) Date of Patent: Jun. 28, 2016

(54) CERAMIC CAPACITOR HAVING A SMALL VARIATION IN CAPACITY

(71) Applicant: Murata Manufacturing Co., Ltd., Nagaokakyo-shi, Kyoto-fu (JP)

(72) Inventors: Hiroaki Kawano, Nagaokakyo (JP); Toshimi Oguni, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 161 days.

(21) Appl. No.: 13/788,099

(22) Filed: Mar. 7, 2013

(65) Prior Publication Data

US 2013/0242462 A1    Sep. 19, 2013

(30) Foreign Application Priority Data

Mar. 16, 2012    (JP) ................................. 2012-060712

(51) Int. Cl.
| *H01G 4/005* | (2006.01) |
| *H01G 4/30* | (2006.01) |
| *H01G 4/008* | (2006.01) |
| *H01G 4/12* | (2006.01) |
| *H01G 4/232* | (2006.01) |

(52) U.S. Cl.
CPC ............. *H01G 4/005* (2013.01); *H01G 4/0085* (2013.01); *H01G 4/1227* (2013.01); *H01G 4/232* (2013.01); *H01G 4/30* (2013.01)

(58) Field of Classification Search
CPC ......... H01G 4/005; H01G 4/30; H01G 4/232; H01G 4/0085; H01G 4/12
USPC ........................................... 361/321.2, 306.3
See application file for complete search history.

(56) References Cited

U.S. PATENT DOCUMENTS

| 6,912,115 B2* | 6/2005 | Kobayashi et al. ........ 361/306.3 |
| 7,324,325 B2* | 1/2008 | Kojima et al. ................ 361/311 |
| 2005/0094351 A1 | 5/2005 | Kobayashi |
| 2008/0063877 A1* | 3/2008 | Ukuma ........................ 428/433 |
| 2008/0144253 A1* | 6/2008 | Togashi ..................... 361/301.4 |
| 2010/0091429 A1 | 4/2010 | Koga et al. |
| 2011/0001399 A1 | 1/2011 | Oguni et al. |
| 2011/0267736 A1* | 11/2011 | Sasabayashi et al. ...... 361/301.1 |
| 2012/0327557 A1* | 12/2012 | Ahn et al. ................... 361/321.3 |

FOREIGN PATENT DOCUMENTS

| JP | 6-69062 A | | 3/1994 |
| JP | 06163311 A | * | 6/1994 |
| JP | 9-69464 A | | 3/1997 |
| JP | 2000106321 A | * | 4/2000 |
| JP | 2005-136131 A | | 5/2005 |

(Continued)

OTHER PUBLICATIONS

Official Communication issued in corresponding Japanese Patent Application No. 2012-060712, mailed on Feb. 26, 2014.

*Primary Examiner* — David M Sinclair
(74) *Attorney, Agent, or Firm* — Keating & Bennett, LLP (57) ABSTRACT

When a voltage two times a rated voltage is applied between a first external electrode and a second external electrode of a ceramic capacitor, the electric field intensity generated at portion connected between a first internal electrode and an end of a portion of a second external electrode at a side of a first side surface by a shortest distance $F_S$ is about 0.34 kV/mm or less.

19 Claims, 5 Drawing Sheets

(56) References Cited

FOREIGN PATENT DOCUMENTS

| JP | 2007-180322 A | 7/2007 |
| JP | 201014716 A * | 7/2010 |
| JP | 2011-014698 A | 1/2011 |
| WO | 2009/001842 A1 | 12/2008 |

* cited by examiner

CERAMIC CAPACITOR HAVING A SMALL VARIATION IN CAPACITY

BACKGROUND OF THE INVENTION

1. Field of the Invention

The present invention relates to a ceramic capacitor.

2. Description of the Related Art

Hitherto, a ceramic capacitor has been used in electronic apparatuses. In general, the ceramic capacitor is mounted on a substrate using solder or the like.

In recent years, the use of a solder that does not contain lead (hereinafter referred to as "Pb-free solder") having a high environmental load has started. However, since the melting point of the Pb-free solder is low, when a ceramic capacitor is mounted in vehicles, it has been difficult to use the Pb-free solder.

Hence, it has been considered to use an electrical conductive adhesive instead of using the Pb-free solder. As the electrical conductive adhesive used for ceramic capacitor mounting, in general, a thermosetting resin, such as an epoxy resin, containing a metal filler of Ag or the like has been used (for example, see International Publication No. WO 2009/001842).

When a ceramic capacitor is mounted on a substrate, an electrical adhesive may adhere to a surface of a ceramic base of the ceramic capacitor in some cases. In such a case, because of an electric field generated between an internal electrode located closest to the substrate when the ceramic capacitor is mounted thereon and the electrical conductive adhesive adhering to the ceramic base, Ag contained in the electrical adhesive moves into the ceramic base to cause Ag migration that reaches the end of the internal electrode, and as a result, the insulating resistance may be degraded in some cases.

In addition, when the electrical conductive adhesive is used, the outermost layer of an external electrode of the ceramic capacitor preferably contains Ag. When a high voltage is applied to the ceramic capacitor, Ag contained in the external electrode may move therefrom to the other external electrode through the surface of the ceramic capacitor, so that migration may occur in some cases.

In order to suppress the Ag migration described above, for example, reduction in the electric field to be applied to the end of the external electrode has been considered by providing a dummy electrode outside an internal electrode that is located at an outermost position in the ceramic base and by arranging a primary surface of the ceramic capacitor to face a mounting substrate. However, for example, in the case in which the ceramic capacitor has a substantially prismatic shape or the like, a ceramic capacitor mounted so that a primary surface thereof faces the mounting substrate and a ceramic capacitor mounted so that a side surface thereof faces the mounting substrate may be randomly mixed together in some cases. In the ceramic capacitor mounted so that the primary surface thereof faces the mounting substrate, although the electric field intensity applied to the end of the external electrode can be reduced by the dummy electrode, in the ceramic capacitor mounted so that the side surface thereof faces the mounting substrate, even if the dummy electrode is provided, the electric field intensity applied to the end of the external electrode is not likely to be reduced.

In consideration of the problem described above, according to International Publication No. WO 2009/001842, it has been proposed to reduce the electric field generated between the internal electrode and the electrical conductive adhesive by decreasing the size of a front end portion of the internal electrode.

However, if it is attempted to decrease the size of the front end portion of the internal electrode, when a conductive paste layer is printed to form the internal electrode, for example, oozing and/or blurring may occur, and as a result, the shape of the internal electrode is liable to vary. Hence, the ceramic capacitor thus formed disadvantageously has a considerable variation in capacity.

SUMMARY OF THE INVENTION

According to preferred embodiments of the present invention, a ceramic capacitor which can be manufactured with a small variation in capacity is provided.

A ceramic capacitor according to a preferred embodiment of the present invention includes a ceramic base, a first internal electrode, a second internal electrode, a first external electrode, and a second external electrode. The ceramic base includes a first and a second primary surface, a first and a second side surface, and a first and a second end surface. The first and the second primary surfaces each extend along a length direction and a width direction. The first and the second side surfaces each extend along the length direction and a thickness direction. The first and the second end surfaces each extend along the width direction and the thickness direction. The ceramic base preferably has a rectangular or substantially rectangular parallelepiped shape. The first internal electrode extends in the ceramic base along the length direction and the width direction. The first internal electrode is exposed at the first end surface. The first internal electrode preferably has a rectangular or substantially rectangular shape. The second internal electrode is arranged in the ceramic base so as to face the first internal electrode in the thickness direction. The second internal electrode is exposed at the second end surface. The second internal electrode preferably has a rectangular or substantially rectangular shape. The first external electrode includes a first portion arranged on the first end surface, second portions arranged on the primary surfaces, and third portions arranged on the side surfaces. The first external electrode is electrically connected to the first internal electrode. The first external electrode contains Ag at least in its surface layer. The second external electrode includes a fourth portion arranged on the second end surface, fifth portions arranged on the primary surfaces, and sixth portions arranged on the side surfaces. The second external electrode is electrically connected to the second internal electrode. The second external electrode contains Ag at least in its surface layer. In the ceramic capacitor, when a voltage two times the rated voltage is applied between the first external electrode and the second external electrode, the electric field intensity generated at a portion connected the first internal electrode and the end of the sixth portion at the side of the first end surface by a shortest distance $F_S$ is approximately 0.34 kV/mm or less, for example.

According to another preferred embodiment of the present invention, in the ceramic capacitor, a shortest distance $F_W$ between the second side surface and the end of the first internal electrode in the width direction, a shortest distance $F_L$ between the second end surface and the end of the first internal electrode at the side of the second end surface, and a shortest distance $F_E$ in the length direction between the second end surface and the end of the sixth portion at the side of the first end surface satisfy the following formulas.

$$F_W \geq 50\ \mu m, F_L \geq \sqrt{(V/(0.34\times 2))^2 - F_W^2} + F_E$$

In the above formula, V indicated a voltage to be applied to the ceramic capacitor.

According to various preferred embodiments of the present invention, a ceramic capacitor which can be manufactured with a small variation in capacity is provided.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, non-limiting examples of preferred embodiments of the present invention will be described. However, the following preferred embodiments are merely described by way of example. Hence, the present invention is not particularly limited thereto.

In addition, in the drawings, members having the same or substantially the same function are designated by the same reference numeral. In addition, the drawings are each schematically drawn, and the ratio in dimensions of the elements illustrated in the drawings may be different from the actual ratio thereof in some cases. Furthermore, between the drawings, the ratio in dimensions of the elements may be different from each other in some cases. For example, the ratio in dimensions of a particular element is to be appropriately understood based on the following description.

Figure 1:
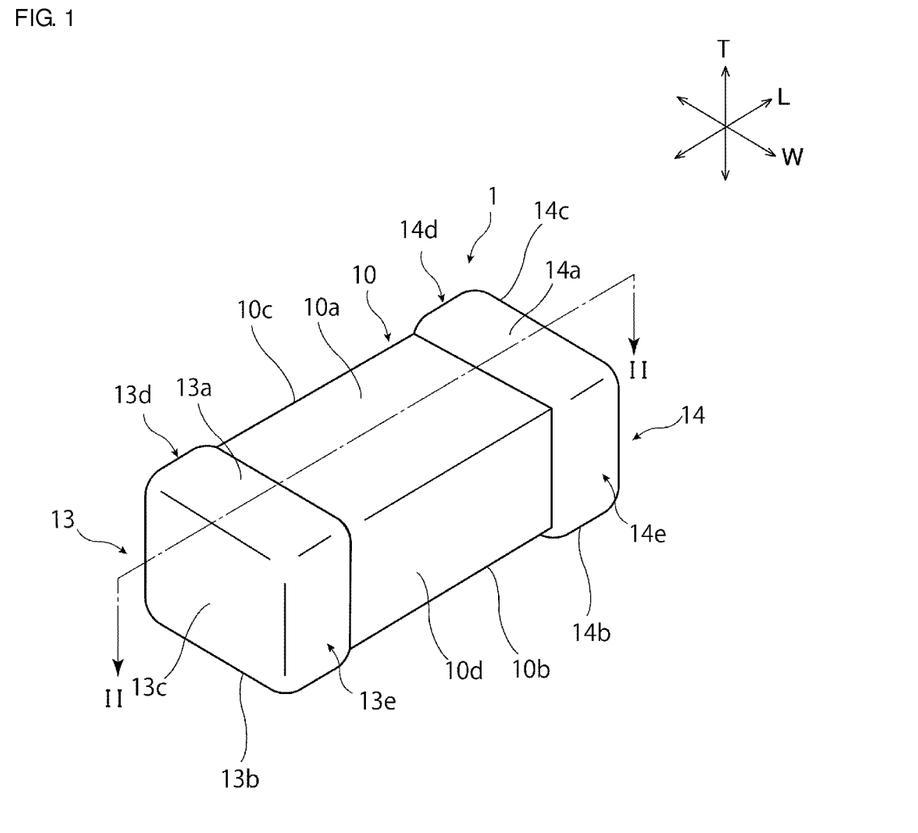
FIG. 1 is a schematic perspective view of a ceramic capacitor according to a preferred embodiment of the present invention.
Figure 2:
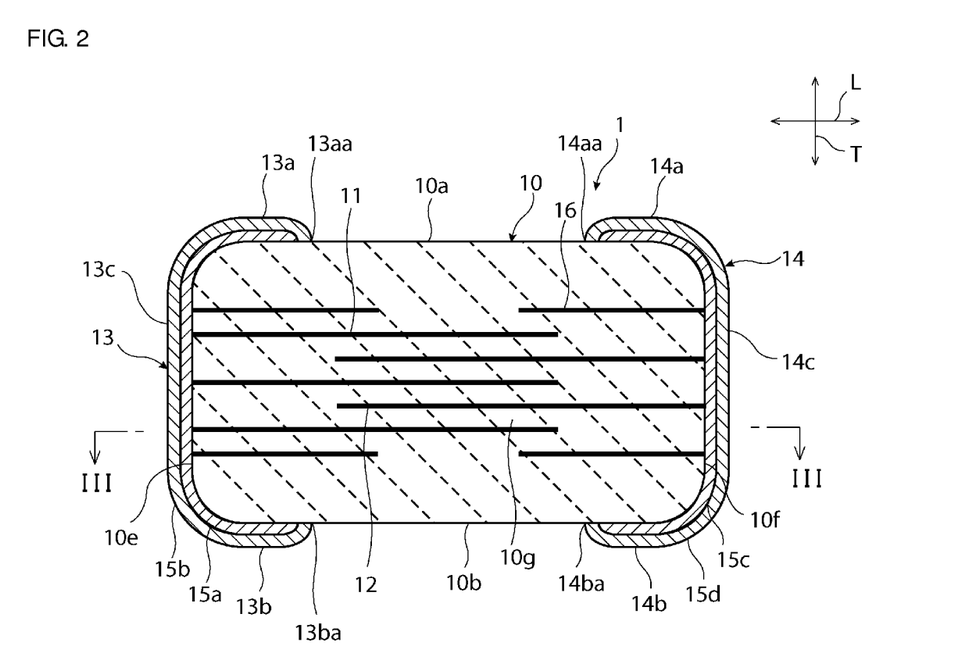
FIG. 2 is a schematic cross-sectional view of the ceramic capacitor taken along the line II-II shown in FIG. 1.
Figure 3:
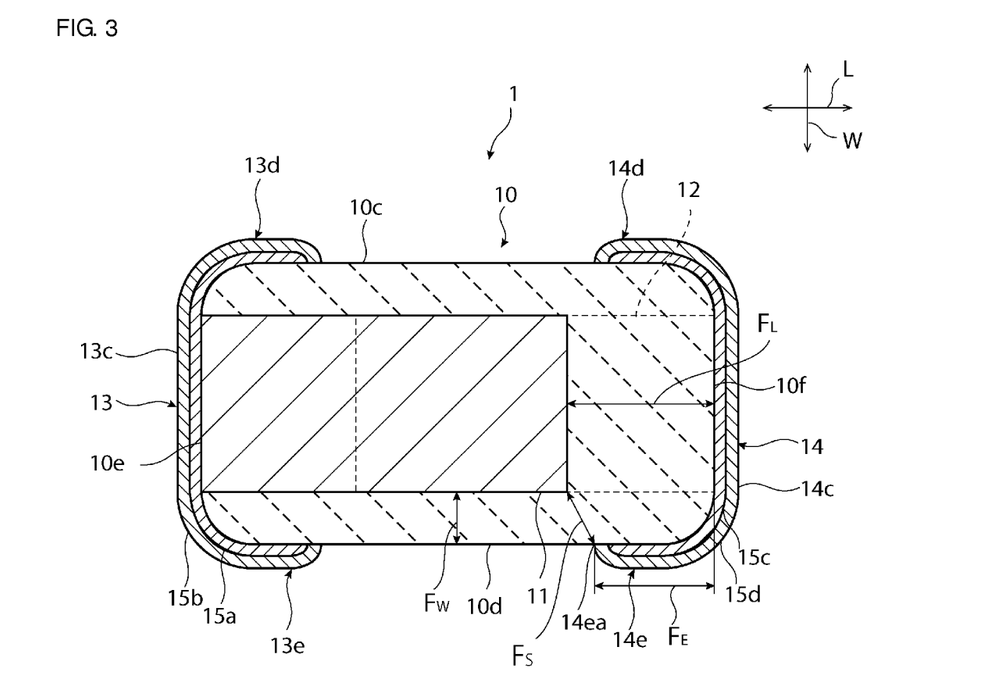
FIG. 3 is a schematic cross-sectional view of the ceramic capacitor taken along the line III-III shown in FIG. 2.

FIG. 1 is a schematic perspective view of a ceramic capacitor according to a preferred embodiment of the present invention. FIG. 2 is a schematic cross-sectional view of the ceramic capacitor taken along the line II-II shown in FIG. 1. FIG. 3 is a schematic cross-sectional view of the ceramic capacitor taken along the line III-III shown in FIG. 2. With reference to FIGS. 1 to 3, the structure of a ceramic capacitor 1 will be first described.

As shown in FIGS. 1 to 3, the ceramic capacitor 1 preferably includes a ceramic base 10, first internal electrodes 11, second internal electrodes 12, a first external electrode 13, and a second external electrode 14.

The ceramic base 10 is formed from an appropriate ceramic material selected in accordance with the function of the ceramic capacitor 1. In particular, the ceramic base 10 may be formed from a dielectric ceramic material, for example. As particular non-limiting examples of the dielectric ceramic material, for example, $BaTiO_3$, $CaTiO_3$, $SrTiO_3$, and $CaZrO_3$ may be mentioned. In addition, when the ceramic base 10 contains a dielectric ceramic material, in accordance with desired properties of the ceramic capacitor 1, besides the above ceramic material to be used as a primary component, for example, an Mn compound, an Mg compound, a Si compound, a Fe compound, a Cr compound, a Co compound, a Ni compound, and/or a rare earth compound may also be used as an accessory component, for example.

The ceramic base 10 preferably has a rectangular or substantially rectangular parallelepiped shape. The ceramic base includes a first primary surface 10a and a second primary surface 10b each extending along a length direction L and a width direction W. The ceramic base 10 includes a first side surface 10c and a second side surface 10d each extending along the length direction L and a thickness direction T. The ceramic base 10 includes a first end surface 10e and a second end surface 10f each extending along the width direction W and the thickness direction T.

In addition, in this specification, the "rectangular parallelepiped shape" includes a substantially rectangular parallelepiped shape having rounded corner portions and rounded ridge lines. That is, the member of the "rectangular parallelepiped shape" includes every member having first and second primary surfaces, first and second side surfaces, and first and second end surfaces. In addition, concavities, convexities, and the like may be partially or entirely provided in the primary surfaces, the side surfaces, and the end surfaces.

The dimensions of the ceramic base 10 are not particularly limited. When the thickness, the length, and the width of the ceramic base 10 are represented by $D_T$, $D_L$, and $D_W$, respectively, for example, 0.38 mm≤$D_T$, 0.18 mm≤$D_L$, and 0.18 mm≤$D_W$ may be acceptable. In addition, the thickness $D_T$ of the ceramic base 10 may be the same as the width $D_W$ thereof, for example.

As shown in FIGS. 2 and 3, in the ceramic base 10, the rectangular or substantially rectangular first internal electrodes 11 and the rectangular or substantially rectangular second internal electrodes 12 are alternately arranged along the thickness direction T. The first internal electrodes 11 each extend in the ceramic base 10 along the length direction L and the width direction W. The first internal electrodes 11 are exposed at the first end surface 10e. The second internal electrodes 12 are arranged in the ceramic base 10 to face the first internal electrodes 11 in the thickness direction T. The second internal electrodes 12 each extend in the ceramic base 10 along the length direction L and the width direction W. The second internal electrodes 12 are exposed at the second end surface 10f. The first and the second internal electrodes 11 and 12 are each parallel or substantially parallel to the first and the second primary surfaces 10a and 10b.

The first internal electrodes 11 and the second internal electrodes 12 face each other in the thickness direction T with ceramic layers 10g interposed therebetween. The thickness of the ceramic layer 10g is not particularly limited. The thickness of the ceramic layer 10g may be set, for example, to approximately 0.5 µm to 10 µm. The thickness of the first internal electrode 11 and that of the second internal electrode 12 are not also particularly limited. The thickness of the first internal electrode 11 and that of the second internal electrode 12 each may be set, for example, to approximately 0.3 µm to 2.0 µm.

The first internal electrodes 11 and the second internal electrodes 12 each may be formed from an appropriate electrical conductive material. The first internal electrodes 11 and the second internal electrodes 12 each may be formed from a metal, such as Ni, Cu, Ag, Pd, or Au, or an alloy, such as an Ag—Pd alloy, containing at least one of the above metals, for example.

The first external electrode 13 includes a first portion 13c arranged on the first end surface 10e, second portions 13a and 13b arranged on the first and the second primary surfaces 10a and 10b, respectively, and third portions 13d and 13e arranged on the first and the second side surfaces 10c and 10d, respectively. The first external electrode 13 is electrically connected to the first internal electrodes 11. In addition, the first external electrode 13 may not substantially include the second portions 13a and 13b.

The second external electrode 14 includes a fourth portion 14c arranged on the second end surface 10f, fifth portions 14a and 14b arranged on the first and the second primary surfaces 10a and 10b, respectively, and sixth portions 14d and 14e arranged on the first and the second side surfaces 10c and 10d, respectively. The second external electrode 14 is electrically connected to the second internal electrodes 12. In addition, the second external electrode 14 may not substantially include the fifth portions 14a and 14b.

The first and the second external electrodes each preferably contain Ag at least in a surface layer thereof.

The first and the second external electrode 13 and 14 each may include a single layer or a plurality of layers. In the ceramic capacitor 1, the first external electrode 13 preferably includes a first metal layer 15a and a second metal layer 15b, and the second external electrode 14 preferably includes a first metal layer 15c and a second metal layer 15d.

The first metal layers 15a and 15c and the second metal layers 15b and 15d are each preferably formed from at least one metal selected from the group consisting of Cu, Ni, Sn, Pd, Au, Ag, Pd, Bi, and Zn or an alloy containing at least one of the metals mentioned above, for example. However, the second metal layers 15b and 15d each preferably contain Ag. The first metal layers 15a and 15c are each more preferably formed from Cu, Ni or the like, for example. The second metal layers 15b and 15d are each more preferably formed from Ag, an Ag—Pd alloy, an Ag—Cu alloy, or the like, for example. The first metal layers 15a and 15c and the second metal layers 15b and 15d each may be formed by baking an electrical conductive paste or each may be formed of a plating film, for example.

In the ceramic base 10, rectangular or substantially rectangular dummy electrodes 16 are arranged at the sides of the first and the second primary surfaces 10a and 10b farther from first and second internal electrodes 11 and 12 that are located closest to the first and the second primary surfaces 10a and 10b. In the present invention, the "dummy electrode" indicates an electrode which makes substantially no contribution to the capacity generation of the ceramic capacitor. The dummy electrodes 16 are arranged in parallel or substantially in parallel with the first and the second primary surfaces 10a and 10b. The dummy electrode 16 may be formed from the same metal material as that for the first and the second internal electrodes 11 and 12, for example. The dummy electrodes 16 are preferably arranged between a first internal electrode 11 located closest to the second primary surface 10b and an end 14ba of the fifth portion 14b of the second external electrode 14 at the side of the first end surface 10e and between a first internal electrode 11 located closest to the first primary surface 10a and an end 14aa of the fifth portion 14a of the second external electrode 14 at the side of the first end surface 10e. The dummy electrodes 16 are preferably arranged between a second internal electrode 12 located closest to the second primary surface 10b and an end 13ba of the second portion 13b of the first external electrode 13 at the side of the second end surface 10f and between a second internal electrode 12 located closest to the first primary surface 10a and an end 13aa of the second portion 13a of the first external electrode 13 at the side of the second end surface 10f.

Figure 4:
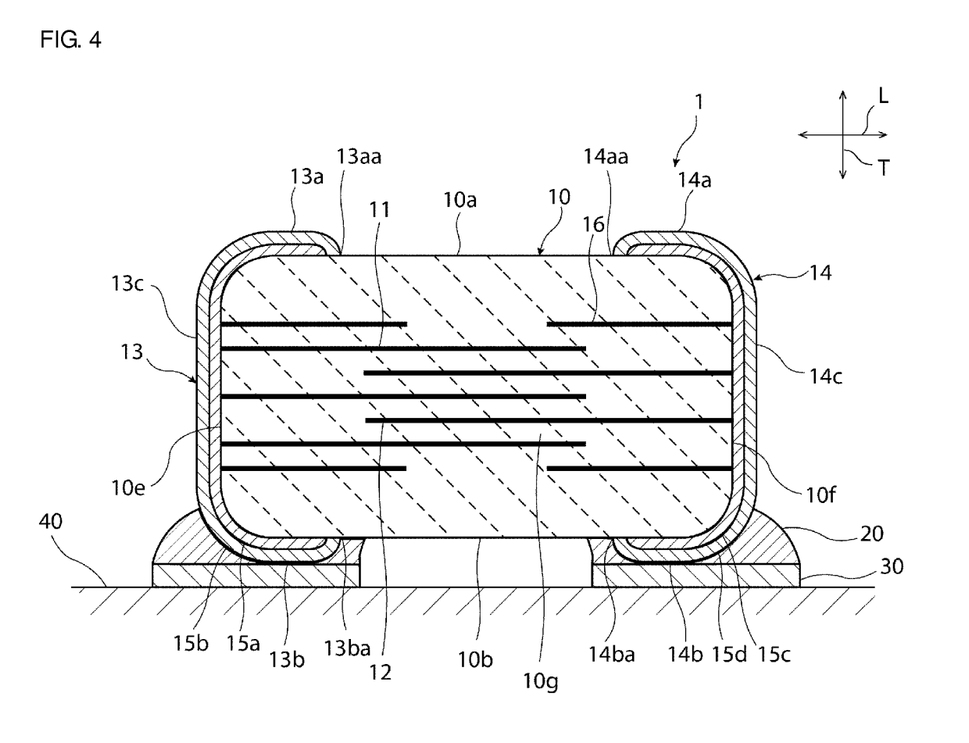
FIG. 4 is a schematic cross-sectional view showing one example in which the ceramic capacitor according to a preferred embodiment of the present invention is mounted on a mounting substrate so that a second primary surface faces the mounting substrate.
Figure 5:
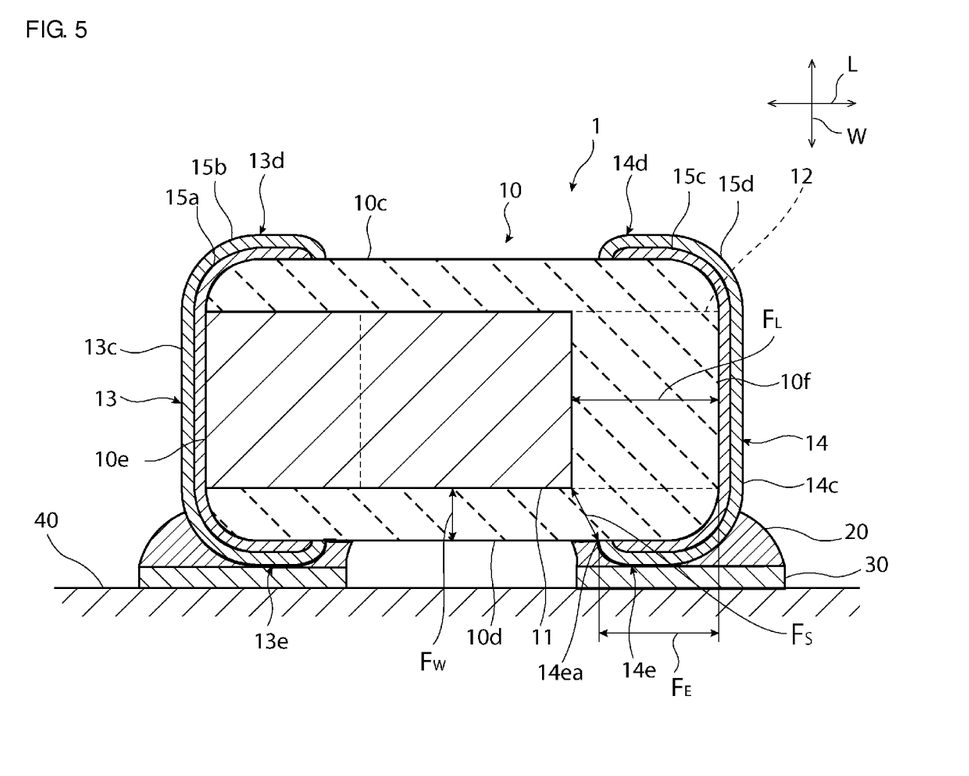
FIG. 5 is a schematic cross-sectional view showing one example in which the ceramic capacitor according to a preferred embodiment of the present invention is mounted on a mounting substrate so that a second side surface faces the mounting substrate.

As shown in FIGS. 4 and 5, the ceramic capacitor 1 is mounted on lands 30 arranged on a mounting substrate 40 with conductive adhesive layers 20 interposed therebetween. In particular, the ceramic capacitor 1 is mounted so that one of the first and the second primary surfaces 10a and 10b faces the mounting substrate 40 or one of the first and the second side surfaces 10c and 10d faces the mounting substrate 40. The external electrodes 13 and 14 of the ceramic capacitor 1 are fixed by the electrical conductive adhesive layers 20. An electrical conductive adhesive preferably contains an electrical conductive filler, such as Ag, and a thermosetting resin, such as an epoxy resin or a phenolic resin, for example.

As described above, by the electric field generated between the internal electrode located closest to the substrate when the ceramic capacitor is mounted on the substrate and the conductive adhesive adhering to the ceramic base, since Ag contained in the electrical conductive adhesive moves into the ceramic base, migration reaching the end of the internal electrode may occur, and as a result, the insulating resistance may be degraded in some cases. In addition, Ag contained in the outermost layer of one external electrode of the ceramic capacitor may move in some cases to the other external electrode through the surface of the ceramic capacitor.

In order to overcome the above problems, in the ceramic capacitor 1, when a voltage two times the rated voltage is applied between the first external electrode 13 and the second external electrode 14 as described later in the subsequent example, the electric field intensity generated at portions connected between the first internal electrodes 11 and an end 14ea of the sixth portion 14e of the second external electrode 14 at the side of the first end surface 10e by a shortest distance $F_S$ is approximately 0.34 kV/mm or less, for example. Hence, even if the second side surface 10d of the ceramic capacitor 1 is mounted to face the mounting substrate 40, the Ag migration is not likely to occur. As in the case described above, even if the first side surface 10c of the ceramic capacitor 1 is mounted to face the mounting substrate 40, the Ag migration is also not likely to occur.

Furthermore, as described later in the subsequent example, in the ceramic capacitor 1, when a shortest distance $F_W$ between the second side surface 10d of the ceramic base 10 and the ends of the first internal electrodes 11 in the width direction W, a shortest distance $F_L$ between the second end surface 10f and the ends of the first internal electrodes 11 at the side of the second end surface 10f, and a shortest distance $F_E$ between the second end surface 10f and the end 14ea of the sixth portion 14e of the second external electrode 14 at the side of the first end surface 10e satisfy the following formulas, the Ag migration is not likely to occur.

$$F_W \geq 50\ \mu m, F_L \geq \sqrt{(V/(0.34\times 2))^2 - F_W^2} + F_E$$

In the above formula, V indicates the voltage to be applied to the ceramic capacitor.

In addition, in the ceramic capacitor 1, the rectangular or substantially rectangular dummy electrodes 16 are arranged at the sides of the first and the second primary surfaces 10a and 10b farther from the first and the second internal electrodes 11 and 12 located closest to the first and the second primary surfaces 10a and 10b among the first internal electrodes 11 and the second internal electrodes 12 arranged in the ceramic base 10. Hence, for example, when the second primary surface 10b of the ceramic capacitor 1 is mounted to face the mounting substrate 40 as shown in FIG. 4, the electric fields generated between the electrical conductive adhesive layers 20 and the first and the second internal electrodes 11 and 12 are reduced by the dummy electrodes 16, and as a result, the Ag migration can be significantly reduced and prevented. In addition, as in the case described above, when the first primary surface 10a is mounted to face the mounting substrate 40, the Ag migration can also be significantly reduced and prevented.

Next, one non-limiting example of a method for manufacturing a ceramic electronic component 1 according to another preferred embodiment of the present invention will be described.

First, ceramic green sheets each containing a ceramic material are prepared to form the ceramic base 10. Next, a conductive paste is applied to the ceramic green sheets to form electrical conductive patterns. In addition, the application of the electrical conductive paste can be performed by various printing methods, such as a screen printing method, for example. Besides electrical conductive fine particles, the electrical conductive paste may also contain a known binder and solvent.

Next, ceramic green sheets on which no electrical conductive patterns are formed, ceramic green sheets on which electrical conductive patterns corresponding to the shapes of the first and the second internal electrodes 11 and 12 and the dummy electrodes 16 are formed, and ceramic green sheets on which no electrical conductive patterns are formed are laminated to each other in this order and are then pressed in a lamination direction, so that a mother laminate is formed.

Subsequently, the mother laminate is cut along imaginary cutting lines provided thereon into green ceramic laminates.

In addition, the cutting of the mother laminate can be performed by dicing or press cutting. The green ceramic laminates may be further processed by barrel polishing or the like so as to round their ridge lines and corner portions.

Next, the green ceramic laminates are fired. In this firing step, the first and the second internal electrodes 11 and 12 and the dummy electrodes 16 are fired. The firing temperature may be appropriately set in accordance with the types of ceramic material and electrical conductive paste to be used. The firing temperature may be set, for example, to approximately 900° C. to 1,300° C.

Subsequently, after an electrical conductive paste is applied on the fired ceramic laminate by a dipping method or the like, the first and the second external electrodes 13 and 14 are formed by baking. The baking temperature is preferably set, for example, to approximately 700° C. to 900° C. As described above, the ceramic electronic component 1 can be manufactured.

Hereinafter, with reference to particular non-limiting examples, the present invention will be described in more detail. The present invention is not limited to the following non-limiting examples and may be appropriately changed and modified without departing from the scope of the present invention.

EXAMPLES

By changing the dimensions of the internal electrode in the length direction and the width direction, samples having the shortest distance $F_W$ between the ends of the internal electrodes and the side surface of the ceramic base, the shortest $F_L$ between the ends of the internal electrodes and the end surface of the ceramic base, and the shortest distance $F_S$ between the first internal electrodes and the end of the sixth portion of the second external electrode at the side of the first end surface were formed as shown in Tables 1 and 2. Specific manufacturing conditions of each sample are shown below. In addition, two types of ceramic capacitors having different dimensions were formed.

Dimensions of ceramic capacitor: 2.0 mm×1.25 mm×1.25 mm (design value)
Ceramic material: $BaTiO_3$
Thickness of ceramic layer: 7 μm after firing (design value)
Material of internal electrode: Ni
Thickness of internal electrode: 0.8 μm after firing (design value)
Total number of internal electrodes: 138
Firing conditions: 1,240° C.
Capacity of ceramic capacitor: 0.47 μF (design value)
Rated voltage of ceramic capacitor: 100 V (design value)
Structure of external electrode: first metal layer: Cu, second metal layer: Ag—Pd
Dimensions of ceramic capacitor: 3.2 mm×1.6 mm×1.6 mm (design value)
Ceramic material: $BaTiO_3$
Thickness of ceramic layer: 7 μm after firing (design value)
Material of internal electrode: Ni
Thickness of internal electrode: 0.8 μm after firing (design value)
Total number of internal electrodes: 186
Firing conditions: 1,240° C.
Capacity of ceramic capacitor: 1 μF (design value)
Rated voltage of ceramic capacitor: 100 V (design value)
Structure of external electrode: first metal layer: Cu, second metal layer: Ag—Pd Evaluation of Ag Migration Next, samples obtained under the above conditions were each mounted on a glass epoxy substrate using an electrical conductive adhesive containing an Ag filler and an epoxy resin with lands interposed therebetween. The initial insulating resistance of each sample mounted on the substrate was measured using a 4 channel high resistance meter (4349B manufactured by Agilent Technologies). Next, by a high temperature load test performed at 150° C. and 25 V to 200 V for 2,000 hours, the insulating resistance was measured in a manner similar to that for the initial insulating resistance. A sample having a lower insulating resistance than the initial insulating resistance by the high temperature load test was regarded as a sample with an Ag migration problem. The evaluation results were each obtained from 80 samples are shown in Tables 1 and 2. In addition, in each sample, the electric field intensity generated at the portion connected by the shortest distance $F_S$ was measured as described below.

First, the ceramic capacitor is polished from the first primary surface extending along the length direction L and the width direction W in parallel with the first and the second internal electrodes. When the first and the second internal electrodes start to be exposed, the distance from the end of the sixth portion of the second external electrode at the side of the first end surface to the corner portion of the first internal electrode is measured, and the distance from the end of the third portion of the first external electrode at the side of the second end surface to the corner portion of the second internal electrode is also measured. Next, as in the case described above, the ceramic capacitor is polished from the second primary surface extending along the length direction L and the width direction W in parallel with the first and the second internal electrodes. When the first and the second internal electrodes start to be exposed, the distance from the end of the sixth portion of the second external electrode at the side of the first end surface to the corner portion of the first internal electrode is measured, and the distance from the end of the third portion of the first external electrode at the side of the second end surface to the corner portion of the second internal electrode is also measured. Subsequently, among the values thus obtained at the above four positions, the smallest value is defined as the shortest distance F. The value of this shortest distance $F_S$ was applied to the formula, "electric field intensity=applied voltage/2/shortest distance $F_S$", and for each sample, the electric field intensity generated at the portion connected by the shortest distance $F_S$ was measured.

In addition, structural defects, such as external-electrode peeling, of 1,000 samples were checked by visual inspection. The results are shown in Tables 1 and 2.

As shown in Tables 1 and 2, when the voltage is applied between the first external electrode and the second external electrode, if the electric field intensity generated at the portion connected by the shortest distance $F_S$ is about 0.34 kV/mm or less, it is determined that the Ag migration and the structural defects are significantly reduced and prevented. This reduction and prevention effect can also be obtained even if a high voltage (200 V), two times the rated voltage (100 V), is applied.

In addition, from the results described above, it is determined that in order to reduce and prevent the Ag migration and the structural defects of each sample, the relationship, electric field intensity≥applied voltage $(V)/(\sqrt{(F_L-F_E)^2+F_W^2})$, may be satisfied. That is, when $F_L \geq \sqrt{((V/(0.34\times2))^2-F_W^2)}+F_E$ holds, it is determined that the Ag migration and the structural defects of the ceramic capacitor can be significantly reduced and prevented. In addition, when $F_W$ is less than about 50 μm, since the adhesion in the ceramic base is liable to be degraded, $F_W \geq 50$ μm is preferably satisfied.

Furthermore, from the results shown in Tables 1 and 2, it is determined that the relationship between the applied voltage (V) and the shortest distance $F_S$ in which the electric field intensity generated at the portion connected by the shortest distance $F_S$ is about 0.34 kV/mm or less is as shown in Table 3.

TABLE 1

| SAMPLE | DIMENSIONS OF CERAMIC CAPACITOR (mm × mm) | RATED VOLTAGE (V) | APPLIED VOLTAGE (V) | SHORTEST DISTANCE $F_L$ (μm) | SHORTEST DISTANCE $F_W$ (μm) | SHORTEST DISTANCE $F_E$ (μm) | SHORTEST DISTANCE $F_S$ (μm) | ELECTRIC FIELD INTENSITY GENERATED AT PORTION CONNECTED BY SHORTEST DISTANCE $F_S$ (kV/mm) | NUMBER OF SAMPLES WITH MIGRATION | NUMBER OF SAMPLES WITH STRUCTURAL DEFECTS |
|---|---|---|---|---|---|---|---|---|---|---|
| 1 | 2.0 × 1.25 × 1.25 | 100 | 25 | 130 | 20 | 150 | 20 | 0.63 | 80/80 | 372/1000 |
| 2 | 2.0 × 1.25 × 1.25 | 100 | 25 | 130 | 25 | 150 | 25 | 0.50 | 80/80 | 151/1000 |
| 3 | 2.0 × 1.25 × 1.25 | 100 | 25 | 130 | 30 | 150 | 30 | 0.42 | 80/80 | 68/1000 |
| 4 | 2.0 × 1.25 × 1.25 | 100 | 25 | 130 | 37 | 150 | 37 | 0.34 | 0/80 | 45/1000 |
| 5 | 2.0 × 1.25 × 1.25 | 100 | 25 | 130 | 50 | 150 | 50 | 0.25 | 0/80 | 0/1000 |
| 6 | 2.0 × 1.25 × 1.25 | 100 | 25 | 200 | 50 | 150 | 71 | 0.18 | 0/80 | 0/1000 |
| 7 | 2.0 × 1.25 × 1.25 | 100 | 25 | 250 | 50 | 150 | 112 | 0.11 | 0/80 | 0/1000 |
| 8 | 2.0 × 1.25 × 1.25 | 100 | 25 | 150 | 100 | 150 | 100 | 0.13 | 0/80 | 0/1000 |
| 9 | 2.0 × 1.25 × 1.25 | 100 | 37.5 | 150 | 40 | 150 | 40 | 0.47 | 80/80 | 142/1000 |
| 10 | 2.0 × 1.25 × 1.25 | 100 | 37.5 | 260 | 40 | 150 | 117 | 0.16 | 0/80 | 42/1000 |
| 11 | 2.0 × 1.25 × 1.25 | 100 | 37.5 | 165 | 50 | 150 | 52 | 0.36 | 80/80 | 0/1000 |
| 12 | 2.0 × 1.25 × 1.25 | 100 | 37.5 | 173 | 50 | 150 | 55 | 0.34 | 0/80 | 0/1000 |
| 13 | 2.0 × 1.25 × 1.25 | 100 | 37.5 | 200 | 50 | 150 | 71 | 0.27 | 0/80 | 0/1000 |
| 14 | 2.0 × 1.25 × 1.25 | 100 | 37.5 | 250 | 50 | 150 | 112 | 0.17 | 0/80 | 0/1000 |
| 15 | 2.0 × 1.25 × 1.25 | 100 | 37.5 | 200 | 100 | 150 | 112 | 0.17 | 0/80 | 0/1000 |
| 16 | 2.0 × 1.25 × 1.25 | 100 | 50 | 150 | 40 | 150 | 40 | 0.63 | 80/80 | 132/1000 |
| 17 | 2.0 × 1.25 × 1.25 | 100 | 50 | 300 | 40 | 150 | 155 | 0.16 | 0/80 | 89/1000 |
| 18 | 2.0 × 1.25 × 1.25 | 100 | 50 | 195 | 50 | 150 | 67 | 0.37 | 80/80 | 0/1000 |
| 19 | 2.0 × 1.25 × 1.25 | 100 | 50 | 205 | 50 | 150 | 74 | 0.34 | 0/80 | 0/1000 |
| 20 | 2.0 × 1.25 × 1.25 | 100 | 50 | 250 | 50 | 150 | 112 | 0.22 | 0/80 | 0/1000 |
| 21 | 2.0 × 1.25 × 1.25 | 100 | 50 | 300 | 50 | 150 | 158 | 0.16 | 0/80 | 0/1000 |
| 22 | 2.0 × 1.25 × 1.25 | 100 | 75 | 200 | 50 | 150 | 71 | 0.53 | 80/80 | 0/1000 |
| 23 | 2.0 × 1.25 × 1.25 | 100 | 75 | 248 | 50 | 150 | 110 | 0.34 | 0/80 | 0/1000 |
| 24 | 2.0 × 1.25 × 1.25 | 100 | 75 | 300 | 50 | 150 | 158 | 0.24 | 0/80 | 0/1000 |
| 25 | 2.0 × 1.25 × 1.25 | 100 | 75 | 350 | 50 | 150 | 206 | 0.18 | 0/80 | 0/1000 |
| 26 | 2.0 × 1.25 × 1.25 | 100 | 150 | 300 | 50 | 150 | 158 | 0.47 | 80/80 | 0/1000 |
| 27 | 2.0 × 1.25 × 1.25 | 100 | 150 | 365 | 50 | 150 | 221 | 0.34 | 0/80 | 0/1000 |
| 28 | 2.0 × 1.25 × 1.25 | 100 | 150 | 600 | 50 | 150 | 453 | 0.17 | 0/80 | 0/1000 |
| 29 | 2.0 × 1.25 × 1.25 | 100 | 200 | 300 | 40 | 150 | 155 | 0.64 | 80/80 | 168/1000 |
| 30 | 2.0 × 1.25 × 1.25 | 100 | 200 | 441 | 40 | 150 | 294 | 0.34 | 0/80 | 49/1000 |
| 31 | 2.0 × 1.25 × 1.25 | 100 | 200 | 100 | 50 | 150 | 255 | 0.39 | 80/80 | 0/1000 |
| 32 | 2.0 × 1.25 × 1.25 | 100 | 200 | 150 | 50 | 150 | 304 | 0.33 | 0/80 | 0/1000 |
| 33 | 2.0 × 1.25 × 1.25 | 100 | 200 | 500 | 100 | 150 | 364 | 0.27 | 0/80 | 0/1000 |

TABLE 2

| SAMPLE | DIMENSIONS OF CERAMIC CAPACITOR (mm × mm) | RATED VOLTAGE (V) | APPLIED VOLTAGE (V) | SHORTEST DISTANCE $F_L$ (μm) | SHORTEST DISTANCE $F_W$ (μm) | SHORTEST DISTANCE $F_E$ (μm) | SHORTEST DISTANCE $F_S$ (μm) | ELECTRIC FIELD INTENSITY GENERATED AT PORTION CONNECTED BY SHORTEST DISTANCE $F_S$ (kV/mm) | NUMBER OF SAMPLES WITH MIGRATION | NUMBER OF SAMPLES WITH STRUCTURAL DEFECTS |
|---|---|---|---|---|---|---|---|---|---|---|
| 34 | 3.2 × 1.6 × 1.6 | 100 | 25 | 130 | 20 | 150 | 20 | 0.63 | 80/80 | 780/1000 |
| 35 | 3.2 × 1.6 × 1.6 | 100 | 25 | 130 | 25 | 150 | 25 | 0.50 | 80/80 | 238/1000 |
| 36 | 3.2 × 1.6 × 1.6 | 100 | 25 | 130 | 37 | 150 | 37 | 0.34 | 0/80 | 75/1000 |
| 37 | 3.2 × 1.6 × 1.6 | 100 | 25 | 130 | 50 | 150 | 50 | 0.25 | 0/80 | 0/1000 |
| 38 | 3.2 × 1.6 × 1.6 | 100 | 25 | 250 | 50 | 150 | 112 | 0.11 | 0/80 | 0/1000 |
| 39 | 3.2 × 1.6 × 1.6 | 100 | 25 | 150 | 100 | 150 | 100 | 0.13 | 0/80 | 0/1000 |
| 40 | 3.2 × 1.6 × 1.6 | 100 | 37.5 | 150 | 40 | 150 | 40 | 0.47 | 80/80 | 260/1000 |
| 41 | 3.2 × 1.6 × 1.6 | 100 | 37.5 | 188 | 40 | 150 | 55 | 0.34 | 0/80 | 89/1000 |
| 42 | 3.2 × 1.6 × 1.6 | 100 | 37.5 | 165 | 50 | 150 | 52 | 0.36 | 80/80 | 0/1000 |
| 43 | 3.2 × 1.6 × 1.6 | 100 | 37.5 | 173 | 50 | 150 | 55 | 0.34 | 0/80 | 0/1000 |
| 44 | 3.2 × 1.6 × 1.6 | 100 | 37.5 | 200 | 50 | 150 | 71 | 0.27 | 0/80 | 0/1000 |
| 45 | 3.2 × 1.6 × 1.6 | 100 | 37.5 | 150 | 100 | 150 | 100 | 0.19 | 0/80 | 0/1000 |
| 46 | 3.2 × 1.6 × 1.6 | 100 | 50 | 150 | 50 | 150 | 50 | 0.50 | 80/80 | 0/1000 |
| 47 | 3.2 × 1.6 × 1.6 | 100 | 50 | 205 | 50 | 150 | 74 | 0.34 | 0/80 | 0/1000 |
| 48 | 3.2 × 1.6 × 1.6 | 100 | 50 | 300 | 50 | 150 | 158 | 0.16 | 0/80 | 0/1000 |
| 49 | 3.2 × 1.6 × 1.6 | 100 | 50 | 400 | 50 | 150 | 255 | 0.10 | 0/80 | 0/1000 |
| 50 | 3.2 × 1.6 × 1.6 | 100 | 75 | 200 | 50 | 150 | 71 | 0.53 | 80/80 | 0/1000 |
| 51 | 3.2 × 1.6 × 1.6 | 100 | 75 | 248 | 50 | 150 | 110 | 0.34 | 0/80 | 0/1000 |
| 52 | 3.2 × 1.6 × 1.6 | 100 | 75 | 300 | 50 | 150 | 158 | 0.24 | 0/80 | 0/1000 |
| 53 | 3.2 × 1.6 × 1.6 | 100 | 75 | 400 | 50 | 150 | 255 | 0.15 | 0/80 | 0/1000 |
| 54 | 3.2 × 1.6 × 1.6 | 100 | 150 | 340 | 50 | 150 | 196 | 0.38 | 80/80 | 0/1000 |
| 55 | 3.2 × 1.6 × 1.6 | 100 | 150 | 365 | 50 | 150 | 221 | 0.34 | 0/80 | 0/1000 |
| 56 | 3.2 × 1.6 × 1.6 | 100 | 150 | 400 | 50 | 150 | 255 | 0.29 | 0/80 | 0/1000 |
| 57 | 3.2 × 1.6 × 1.6 | 100 | 200 | 300 | 40 | 150 | 155 | 0.64 | 80/80 | 211/1000 |
| 58 | 3.2 × 1.6 × 1.6 | 100 | 200 | 441 | 40 | 150 | 294 | 0.34 | 0/80 | 66/1000 |
| 59 | 3.2 × 1.6 × 1.6 | 100 | 200 | 350 | 50 | 150 | 206 | 0.49 | 80/80 | 0/1000 |
| 60 | 3.2 × 1.6 × 1.6 | 100 | 200 | 441 | 50 | 150 | 295 | 0.34 | 0/80 | 0/1000 |
| 61 | 3.2 × 1.6 × 1.6 | 100 | 200 | 600 | 100 | 150 | 461 | 0.22 | 0/80 | 0/1000 |

TABLE 3

| APPLIED VOLTAGE (V) | SHORTEST DISTANCE $F_S$ (μm) | ELECTRIC FIELD INTENSITY (kV/mm) |
|---|---|---|
| 25 | 37 μm or more | 0.34 or less |
| 37.5 | 55 μm or more | |
| 50 | 74 μm or more | |
| 75 | 110 μm or more | |
| 150 | 221 μm or more | |
| 200 | 294 μm or more | |

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A ceramic capacitor comprising:
    a ceramic base including a first and a second primary surface extending along a length direction and a width direction, a first and a second side surface extending along the length direction and a thickness direction, and a first and a second end surface extending along the width direction and the thickness direction;
    first internal electrodes which extend in the ceramic base along the length direction and the width direction and which are exposed at the first end surface;
    second internal electrodes which are arranged in the ceramic base to face the first internal electrodes in the thickness direction and which are exposed at the second end surface;
    a first external electrode which is electrically connected to the first internal electrodes and includes a first portion arranged on the first end surface, second portions arranged on the first and second primary surfaces, and third portions arranged on the first and second side surfaces, and which includes Ag at least in a surface layer thereof; and
    a second external electrode which is electrically connected to the second internal electrodes and includes a fourth portion arranged on the second end surface, fifth portions arranged on the first and second primary surfaces, and sixth portions arranged on the first and second side surfaces, and which includes Ag at least in a surface layer thereof; wherein
    the first external electrode and the second external electrode each include a first metal layer and a second metal layer covering the first metal layer;
    ends of the second portions and the third portions of the second metal layer of the first external electrode are in contact with the surface of the ceramic base;
    ends of the fifth portions and the sixth portions of the second metal layer of the second external electrode are in contact with the surface of the ceramic base;
    when a voltage that is about two times a rated voltage is applied between the first external electrode and the second external electrode, an electric field intensity generated at a portion connected between a corner portion of the first internal electrode and the end of the sixth portion at a side of the first end surface by a shortest distance $F_S$ is about 0.34 kV/mm or less; and $$F_S \leq 461 \text{ μm}.$$

2. The ceramic capacitor according to claim 1, wherein a shortest distance between the second side surface and an end of the first internal electrode in the width direction, a shortest distance between the second end surface and an end of the first internal electrodes at a side of the second end surface, and a shortest distance in the length direction between the second end surface and the end of the sixth portion at the side of the first end surface are represented by $F_W$, $F_L$, and $F_E$, respectively, the following formulas are satisfied $$F_W \geq 50 \, \mu m$$

$$F_L \geq \sqrt{((V/(0.34 \times 2))^2 - F_W^2)} + F_E$$

where V indicates a voltage applied to the ceramic capacitor.

3. The ceramic capacitor according to claim 1, wherein the ceramic base has a rectangular or substantially rectangular parallelepiped shape.

4. The ceramic capacitor according to claim 1, wherein the first internal electrodes have a rectangular or substantially rectangular shape.

5. The ceramic capacitor according to claim 1, wherein the second internal electrodes have a rectangular or substantially rectangular shape.

6. The ceramic capacitor according to claim 1, wherein the ceramic base is made of a dielectric ceramic material.

7. The ceramic capacitor according to claim 6, wherein the dielectric ceramic material is one of $BaTiO_3$, $CaTiO_3$, $SrTiO_3$, and $CaZrO_3$.

8. The ceramic capacitor according to claim 6, wherein the ceramic base includes an Mn compound, an Mg compound, a Si compound, a Fe compound, a Cr compound, a Co compound, a Ni compound, and/or a rare earth compound.

9. The ceramic capacitor according to claim 1, wherein a thickness, a length, and a width of the ceramic base are represented by $D_T$, $D_L$, and $D_W$, respectively, and satisfy the conditions of $0.38 \, mm \leq D_T$, $0.18 \, mm \leq D_L$, and $0.18 \, mm \leq D_W$.

10. The ceramic capacitor according to claim 1, wherein a thickness of the ceramic base is equal or substantially equal to a width thereof.

11. The ceramic capacitor according to claim 1, wherein a thickness of each of the first internal electrodes and the second internal electrodes is about 0.3 μm to about 2.0 μm.

12. The ceramic capacitor according to claim 1, wherein the first internal electrodes and the second internal electrodes are made of a metal including at least one of Ni, Cu, Ag, Pd, or Au, or an alloy thereof.

13. The ceramic capacitor according to claim 1, wherein each of the first external electrode and the second external electrode includes only one single layer or a plurality of layers.

14. The ceramic capacitor according to claim 1, wherein the first metal layer is made of Cu or Ni, and the second metal layer is made of Ag, an Ag—Pd alloy or an Ag—Cu alloy.

15. The ceramic capacitor according to claim 1, further comprising dummy electrodes located at sides of the first and second primary surfaces.

16. The ceramic capacitor according to claim 15, wherein the dummy electrodes are made of the same material of the first and second internal electrodes.

17. The ceramic capacitor according to claim 15, wherein the dummy electrodes are rectangular or substantially rectangular.

18. The ceramic capacitor according to claim 15, wherein the dummy electrodes are arranged at sides of the first and the second primary surfaces farther from the first and the second internal electrodes located closest to the first and the second primary surfaces among the first internal electrodes and the second internal electrodes.

19. An electronic component comprising:
a mounting substrate;
the ceramic capacitor according to claim 1 mounted on the mounting substrate.

* * * * *